United States Patent
Son

(10) Patent No.: US 8,872,987 B2
(45) Date of Patent: Oct. 28, 2014

(54) STEREOSCOPIC IMAGE DISPLAY

(75) Inventor: Hyeonho Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 118 days.

(21) Appl. No.: 13/338,382

(22) Filed: Dec. 28, 2011

(65) Prior Publication Data

US 2012/0169949 A1   Jul. 5, 2012

(30) Foreign Application Priority Data

Dec. 30, 2010   (KR) .................. 10-2010-0138897

(51) Int. Cl.
| | | |
|---|---|---|
| *G02F 1/1335* | (2006.01) | |
| *G02B 27/22* | (2006.01) | |
| *F21V 8/00* | (2006.01) | |
| *G02B 27/26* | (2006.01) | |
| *G02F 1/13363* | (2006.01) | |

(52) U.S. Cl.
CPC .... *G02B 27/26* (2013.01); *G02F 2001/133631* (2013.01); *G02B 6/0056* (2013.01); *G02F 2001/133638* (2013.01)
USPC ........................................... 349/15; 359/464

(58) Field of Classification Search
USPC .................. 349/15; 345/6; 359/464
See application file for complete search history.

(56) References Cited

U.S. PATENT DOCUMENTS

| | | | |
|---|---|---|---|
| 2008/0084512 A1* | 4/2008 | Brott et al. ...................... 349/15 |
| 2010/0265230 A1* | 10/2010 | Kang ............................. 345/211 |
| 2011/0122239 A1* | 5/2011 | Baik et al. ........................ 348/58 |
| 2011/0279761 A1* | 11/2011 | Kong et al. .................... 349/117 |
| 2011/0285927 A1* | 11/2011 | Schultz et al. .................. 349/15 |
| 2012/0188473 A1* | 7/2012 | Chang et al. .................... 349/15 |

FOREIGN PATENT DOCUMENTS

| | | |
|---|---|---|
| CN | 1678943 A | 10/2005 |
| CN | 101867836 A | 10/2010 |

OTHER PUBLICATIONS

CN Office Action issued Dec. 16, 2013.

* cited by examiner

*Primary Examiner* — Edward Glick
*Assistant Examiner* — Mark Teets
(74) *Attorney, Agent, or Firm* — Morgan, Lewis & Bockius LLP

(57) ABSTRACT

A stereoscopic image display includes a liquid crystal display panel, a patterned retarder attached to the liquid crystal display panel, polarizing glasses including a left eye filter passing through only a first polarized light passing through a first pattern of the patterned retarder and a right eye filter passing through only a second polarized light passing through a second pattern of the patterned retarder, and a backlight unit including an upper light source disposed under the upper side of the liquid crystal display panel, a lower light source disposed under the lower side of the liquid crystal display panel, a light guide plate between the upper light source and the lower light source, and a vertical viewing angle improvement sheet having prism patterns opposite to the light guide plate.

4 Claims, 20 Drawing Sheets

FIG. 18

| Related Art | | | | |
|---|---|---|---|---|
| Vertical viewing angle(deg) | n | L(um) | B(um) | CT(um) |
| 14.6 | 1.5 | 900 | 240 | 7% |

| Present invetion | | | | |
|---|---|---|---|---|
| Vertical viewing angle(deg) | n | L(um) | S(um) | CT(um) |
| 27.3 | 1.5 | 900 | 270 | 7% |

STEREOSCOPIC IMAGE DISPLAY

This application claims the benefit of Korea Patent Application No. 10-2010-0138897 filed on Dec. 30, 2010, the entire contents of which is incorporated herein by reference for all purposes as if fully set forth herein.

BACKGROUND OF THE INVENTION

1. Field of the Invention

Embodiments of the invention relate to a stereoscopic image display.

2. Discussion of the Related Art

A stereoscopic image display implements a stereoscopic image, i.e., a three-dimensional (3D) image using a stereoscopic technique or an autostereoscopic technique. The stereoscopic technique, which uses a parallax image between user's left and right eyes with a high stereoscopic effect, may include a glasses type method and a non-glasses type method, both of which have been put to practical use. In the glasses type method, the parallax image between the left and right eyes is displayed on a direct-view display or a projector through a change in a polarization direction of the left and right parallax image or in a time-division manner, and thus a stereoscopic image is implemented using polarization glasses or liquid crystal shutter glasses. In the non-glasses type method, an optical plate such as a parallax barrier for separating an optical axis of the left and right parallax image is generally installed in front of a display screen.

The glasses type stereoscopic image display is classified into a polarizing glasses type stereoscopic image display and a shutter glasses type stereoscopic image display. In the polarizing glasses type stereoscopic image display, a polarization separation element such as a patterned retarder has to be attached to a display panel. The patterned retarder separates polarized light of left and right eye images displayed on the display panel. When a viewer watches a stereoscopic image through the polarizing glasses type stereoscopic image display using polarizing glasses, he or she sees polarized light of the left eye image through a left eye filter of the polarizing glasses and sees polarized light of the right eye image through a right eye filter of the polarizing glasses, thereby feeling a stereoscopic feeling.

In an existing polarizing glasses type stereoscopic image display, a liquid crystal display panel may be used as a display panel. In this instance, a parallax is generated between a pixel array of the liquid crystal display panel and a patterned retarder because of a thickness of an upper glass substrate of the liquid crystal display panel and a thickness of an upper polarizing plate. Hence, a narrow vertical viewing angle is obtained.

As shown in FIG. 1, a liquid crystal display panel 20 includes an upper glass substrate 4, on which a color filter 6 and black matrixes BM are formed, a lower glass substrate 2, on which a thin film transistor (TFT) array is formed, a liquid crystal layer (not shown) formed between the upper glass substrate 4 and the lower glass substrate 2, an upper polarizing plate 8 attached to the upper glass substrate 4, a lower polarizing plate 14 formed on the lower glass substrate 2, etc.

A patterned retarder substrate 12, on which a patterned retarder 10 is formed, is attached to the upper polarizing plate 8 of the liquid crystal display panel 20. The patterned retarder 10 includes first patterns 10a and second patterns 10b. The first patterns 10a are opposite to odd-numbered lines in a pixel array of the liquid crystal display panel 20, respectively, and the second patterns 10b are opposite to even-numbered lines in the pixel array of the liquid crystal display panel 20, respectively. Optical axes of the first pattern 10a and the second pattern 10b are different from each other. The first patterns 10a and the second patterns 10b retard a phase of incident light by about ¼ wavelength.

In the pixel array of the liquid crystal display panel 20, the odd-numbered lines may display a left eye image, and the even-numbered lines may display a right eye image. In this instance, light of the left eye image displayed on the odd-numbered lines of the pixel array is converted into linearly polarized light through the upper polarizing plate 8 and is incident on the first patterns 10a. Further, light of the right eye image displayed on the even-numbered lines of the pixel array is converted into linearly polarized light through the upper polarizing plate 8 and is incident on the second patterns 10b. The first patterns 10a retard a phase of the linearly polarized light incident through the upper polarizing plate 8 by about ¼ wavelength at a front viewing angle indicated by the dotted line shown in FIG. 1, thereby passing through left-circularly polarized light converted from the light of the left eye image. Further, the second patterns 10b retard a phase of the linearly polarized light incident through the upper polarizing plate 8 by about ¼ wavelength at the front viewing angle, thereby passing through right-circularly polarized light converted from the light of the right eye image. A left eye filter of polarizing glasses 30 passes through only the left-circularly polarized light, and a right eye filter of the polarizing glasses 30 passes through only the right-circularly polarized light. If the viewer wears the polarizing glasses 30, he or she sees only pixels of the odd-numbered lines of the pixel array on which, the left eye image is displayed, through his/her left eye and also sees only pixels of the even-numbered lines of the pixel array on which, the right eye image is displayed, through his/her right eye. Thus, the viewer can watch the stereoscopic image without 3D crosstalk at the front viewing angle.

The light of the left eye image displayed on the odd-numbered lines of the pixel array is converted into the linearly polarized light through the upper polarizing plate 8 at a vertical viewing angle indicated by the solid line shown in FIG. 1 and is incident on the first patterns 10a. In this instance, a portion of the linearly polarized light of the left eye image is incident on the second patterns 10b. Further, the light of the right eye image displayed on the even-numbered lines of the pixel array is converted into the linearly polarized light through the upper polarizing plate 8 at the vertical viewing angle and is incident on the second patterns 10b. In this instance, a portion of the linearly polarized light of the right eye image is incident on the first patterns 10a. Thus, the viewer wearing the polarizing glasses 30 sees pixels of the odd-numbered lines of the pixel array on which, the left eye image is displayed, and pixels of the even-numbered lines of the pixel array on which, the right eye image is displayed, through each of both eyes at the vertical viewing angle. As a result, when the viewer watches the stereoscopic image displayed on the polarizing glasses type stereoscopic image display at the vertical viewing angle, he/she watches a doubled image of the left eye image and the right eye image through his/her left or right eye, thereby feeling the 3D crosstalk.

To solve the 3D crosstalk at the vertical viewing angle in the polarizing glasses type stereoscopic image display, a method for forming black stripes BS on the patterned retarder as shown in FIG. 2 and a method for increasing a width of the black matrix BM of the liquid crystal display panel 20 as shown in FIG. 3 has been proposed. The black stripes BS additionally formed on the patterned retarder elongate in a line direction of the pixel array. As shown in FIG. 4, the black stripes BS overlap some of the odd-numbered lines of the pixel array and some of the even-numbered lines of the pixel array. A width of the black stripe BS is less than about ½ of a pixel pitch of the pixel array.

The method for additionally forming the black stripes BS on the patterned retarder as shown in FIG. 2 and the method for increasing the width of the black matrix BM as shown in FIG. 3 generate problems of a reduction in a light transmittance and a luminance. This is described below with reference to FIG. 5 and Equations (1) to (3).

In FIG. 5, 'θ' is a vertical viewing angle at which the 3D crosstalk may be generated; 'P' is the pixel pitch of the pixel array; 'B' is the width of the black matrix BM; 'L' is a distance (including a thickness of the glass substrate and a thickness of the polarizing plate) between a color filter array and the patterned retarder; and 'n' is an average refractive index of the glass substrate.

Equation (1) indicates geometric conditions inside a medium (i.e., the glass substrate and the polarizing plate). In Equation (1), '$CT_{ref}$' is an allowable maximum value of the 3D crosstalk. Equation (2) indicates a relationship between an angle Φ of light traveling inside the medium by Snell's law and an angle θ of light emitted to the outside through the patterned retarder. Equation (3) is obtained through Equations (1) and (2).

$$d \cdot CT_{ref} + \frac{B}{2} = L\tan\phi \quad (1)$$

$$n\sin\phi = \sin\theta \quad (2)$$

$$\theta = \sin^{-1}\left\{n\sin\left(\tan^{-1}\left(\frac{(P-B)CT_{ref} + \frac{B}{2}}{L}\right)\right)\right\} \quad (3)$$

In the case of 47-inch FHD (full high definition) panel, P is 540 μm, B is 240 μm, L is 900, and n is 1.5 based on the 3D crosstalk of about 7%. When the above values are substituted for Equation (3), the vertical viewing angle satisfying the 3D crosstalk equal to or less than about 7% is estimated to be about 14.6° as shown in FIG. 18. The width B of the black matrix BM has to increase or the distance L between the color filter array and the patterned retarder has to decrease, so as to improve the vertical viewing angle. However, there is a limit to a reduction in the thickness of the glass substrate or the thickness of the polarizing plate. Therefore, because it is difficult to reduce the distance L, the vertical viewing angle may be improved by increasing the width B. However, when the width B of the black matrix BM increases, the transmittance of light in a 2D image and a 3D image is reduced. Hence, the luminance reduction is generated.

SUMMARY OF THE INVENTION

Embodiments of the invention provide a stereoscopic image display capable of increasing a vertical viewing angle and increasing a transmittance in a 2D image.

In one aspect, there is a stereoscopic image display including a liquid crystal display panel including data lines, gate lines crossing the data lines, and a pixel array including pixels arranged in a matrix form, a patterned retarder attached to the liquid crystal display panel, polarizing glasses including a left eye filter passing through only a first polarized light passing through a first pattern of the patterned retarder and a right eye filter passing through only a second polarized light passing through a second pattern of the patterned retarder, and a backlight unit including an upper light source disposed under the upper side of the liquid crystal display panel, a lower light source disposed under the lower side of the liquid crystal display panel, a light guide plate disposed between the upper light source and the lower light source, and a vertical viewing angle improvement sheet having prism patterns opposite to the light guide plate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 18 illustrates a comparison between a related art vertical viewing angle and a vertical viewing angle according to an exemplary embodiment of the invention;

DETAILED DESCRIPTION OF THE EMBODIMENTS

Reference will now be made in detail to the specific embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the invention.

Figure 1:
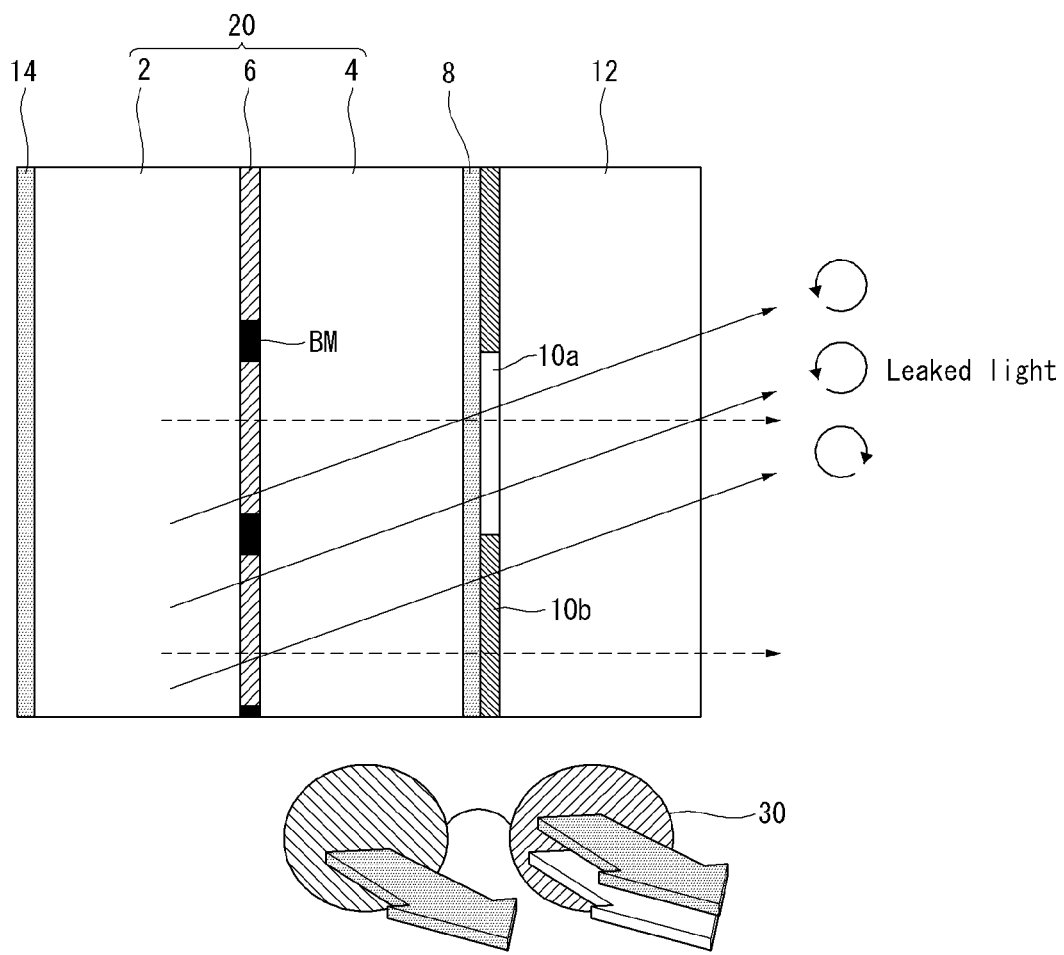
FIG. 1 illustrates a vertical viewing angle, at which a 3D crosstalk is generated, in a polarizing glasses type stereoscopic image display.
Figure 2:
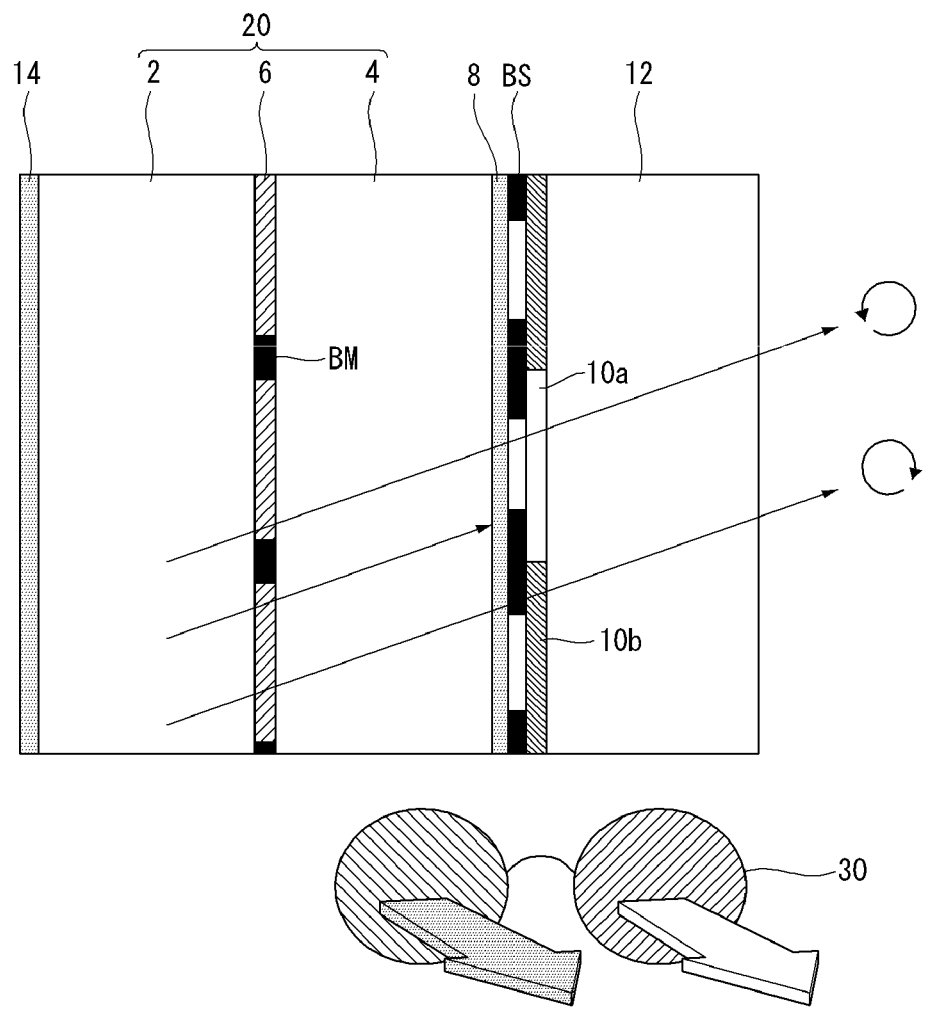
FIG. 2 illustrates an example of additionally forming black stripes on a patterned retarder so as to improve a vertical viewing angle.
Figure 3:
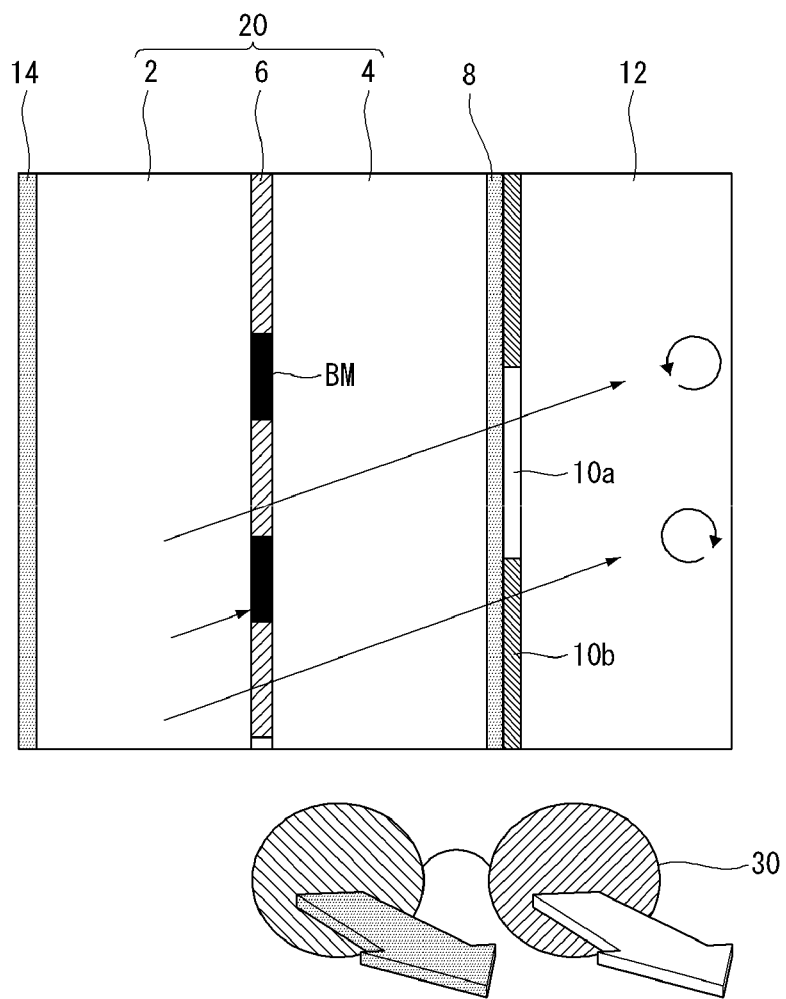
FIG. 3 illustrates an example of increasing a width of a black matrix of a liquid crystal display panel so as to improve a vertical viewing angle.
Figure 4:
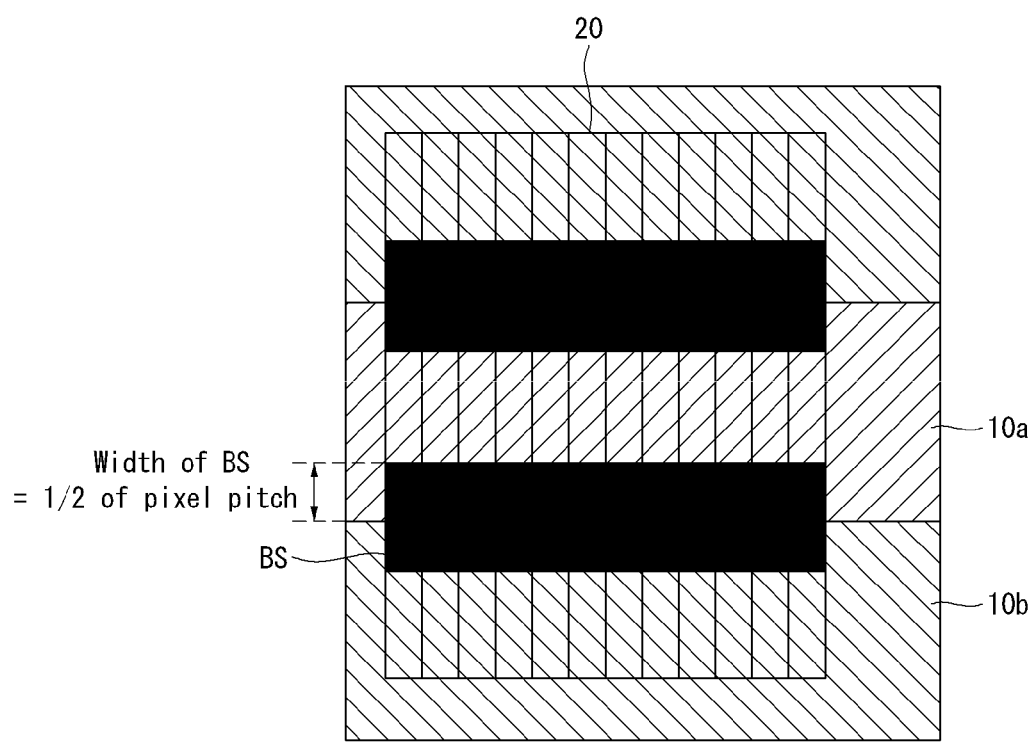
FIG. 4 is a plane view illustrating black stripes, a patterned retarder, and a pixel array.
Figure 5:
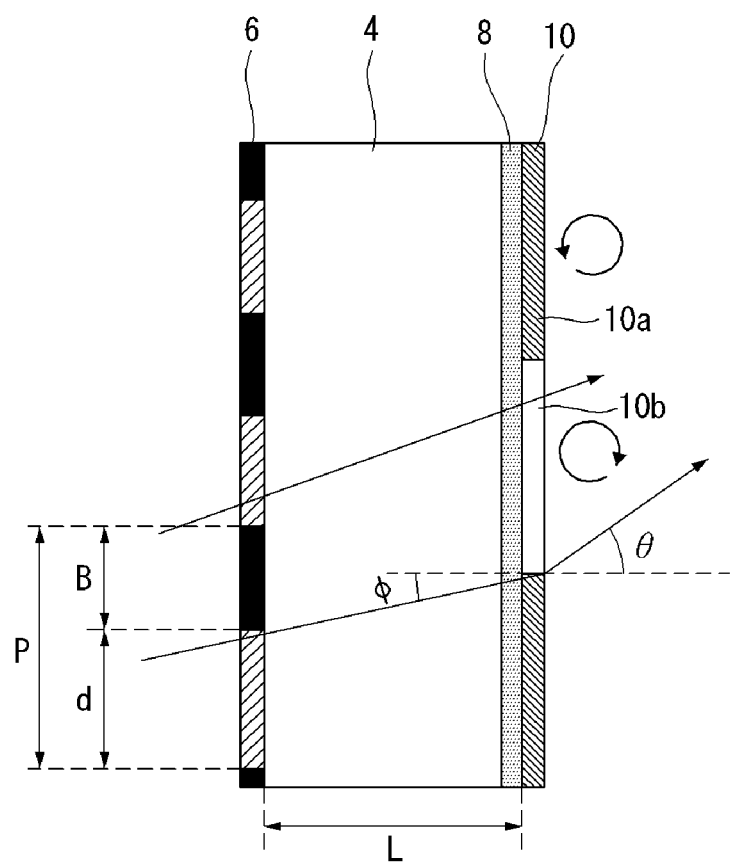
FIG. 5 theoretically illustrates a vertical viewing angle in a stereoscopic image display shown in FIG. 3.
Figure 6:
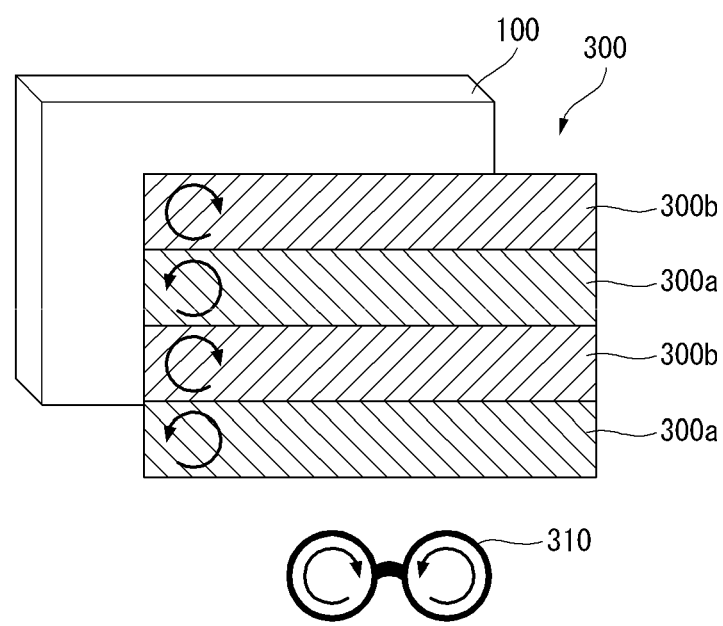
FIG. 6 schematically illustrate a stereoscopic image display according to an exemplary embodiment of the invention.
Figure 7:
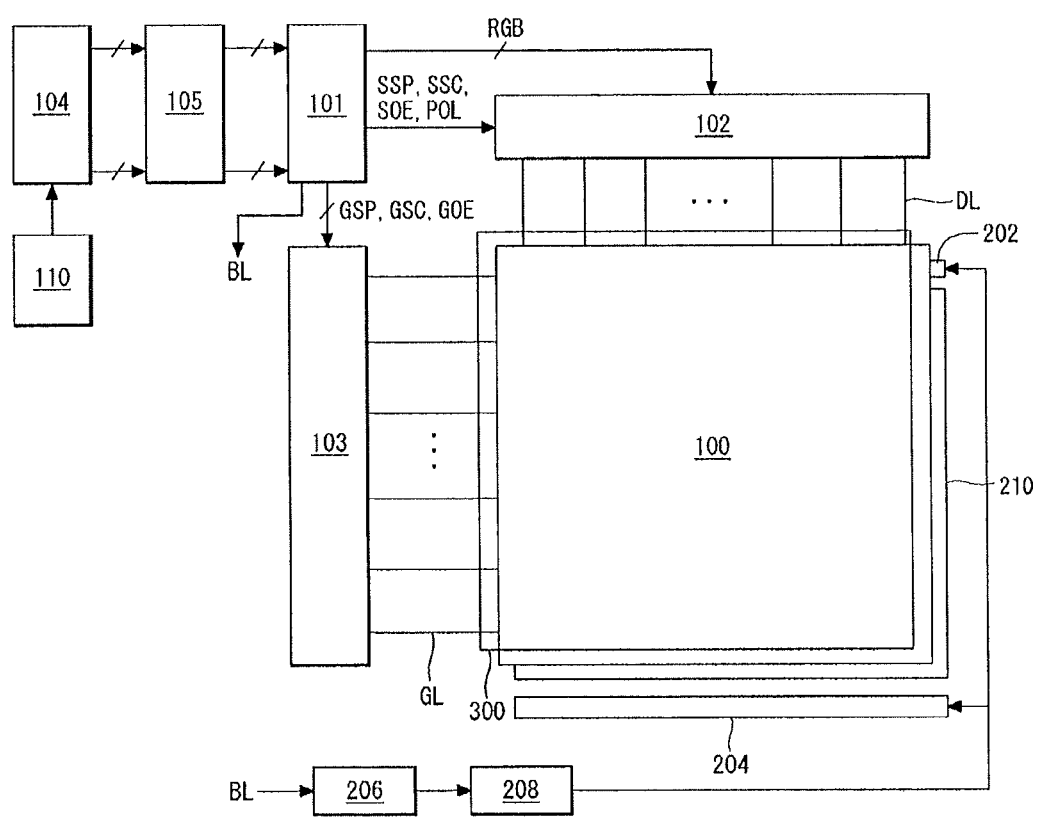
FIG. 7 is a block diagram illustrating a liquid crystal display panel and driving circuits of a backlight unit.

As shown in FIGS. 6 and 7, a stereoscopic image display according to an embodiment of the invention includes a liquid crystal display panel 100, a backlight unit, a patterned retarder 300, polarizing glasses 310, etc.

The liquid crystal display panel 100 displays data of a 2D image and data of a 3D image. The liquid crystal display panel 100 includes a liquid crystal layer between two glass substrates. The liquid crystal display panel 100 includes pixels arranged in a matrix form based on a crossings structure between data lines DL and gate lines GL. Each of the pixels includes a liquid crystal cell.

The data lines DL, the gate lines GL, thin film transistors (TFTs), pixel electrodes, storage capacitors, etc. are formed on a TFT array substrate of the liquid crystal display panel 100. The liquid crystal cells are driven by an electric field between the pixel electrodes connected to the TFTs and common electrodes. Black matrixes, color filters, the common electrodes, etc. are formed on a color filter array substrate of the liquid crystal display panel 100. Polarizing plates are respectively attached to the TFT array substrate and the color filter array substrate of the liquid crystal display panel 100. Alignment layers for setting a pre-tilt angle of liquid crystals are respectively formed on the TFT array substrate and the color filter array substrate of the liquid crystal display panel 100. A column spacer may be formed between the TFT array substrate and the color filter array substrate to keep cell gaps of the liquid crystal cells constant. The liquid crystal display panel 100 may be implemented in a vertical electric field driving manner such as a twisted nematic (TN) mode and a vertical alignment (VA) mode or in a horizontal electric field driving manner such as an in-plane switching (IPS) mode and a fringe field switching (FFS) mode.

The backlight unit may be implemented as an edge type backlight unit including light sources 202 and 204 disposed on the upper side and the lower side of the liquid crystal display panel 100. The light sources 202 and 204 may be implemented as at least one of a cold cathode fluorescent lamp (CCFL), an external electrode fluorescent lamp (EEFL), and a light emitting diode (LED).

The light sources 202 and 204 include an upper light source 202 disposed under the upper side of the liquid crystal display panel 100 and a lower light source 204 disposed under the lower side of the liquid crystal display panel 100. The upper light source 202 and the lower light source 204 are alternatively turned on. For example, the upper light source 202 is turned on and the lower light source 204 is turned off during an Nth frame period, where N is a natural number. Then, the upper light source 202 is turned off and the lower light source 204 is turned on during an (N+1)th frame period. The backlight unit further includes a plurality of optical parts (refer to FIGS. 18 to 21) disposed between the light sources 202 and 204 and the liquid crystal display panel 100. The optical parts of the backlight unit convert a point light source or a line light source into a surface light source. The optical parts include a vertical viewing angle improvement sheet. The vertical viewing angle improvement sheet uniformly condenses light incident from the upper light source 202 at a downward angle (for example, 0°≤downward angle<90°) less than a front viewing angle (i.e., 90°) when the upper light source 202 is turned on. Further, when the lower light source 204 is turned on, the vertical viewing angle improvement sheet uniformly condenses light incident from the lower light source 204 at an upward angle (for example, 90°<upward angle≤180°) greater than the front viewing angle (i.e., 90°).

The patterned retarder 300 is attached to an upper polarizing plate of the liquid crystal-display panel 100. The patterned retarder 300 includes first patterns 300*b* and second patterns 300*a*. The first patterns 300*b* are opposite to odd-numbered lines in a pixel array of the liquid crystal display panel 100, respectively, and the second patterns 300*a* are opposite to even-numbered lines in the pixel array of the liquid crystal display panel 100, respectively. Optical axes of the first pattern 1300*b* and the second pattern 300*a* are different from each other. The first patterns 300*b* and the second patterns 300*a* retard a phase of incident light by about ¼ wavelength.

In the pixel array of the liquid crystal display panel 100, the odd-numbered lines may display a left eye image, and the even-numbered lines may display a right eye image. In this instance, light of the left eye image displayed on the odd-numbered lines of the pixel array is converted into linearly polarized light through the upper polarizing plate and is incident on the first patterns 300*b*. Further, light of the right eye image displayed on the even-numbered lines of the pixel array is converted into linearly polarized light through the upper polarizing plate and is incident on the second patterns 300*a*. The first patterns 300*b* retard a phase of the linearly polarized light incident through the upper polarizing plate by about ¼ wavelength, thereby passing through left-circularly polarized light converted from the light of the left eye image. Further, the second patterns 300*a* retard a phase of the linearly polarized light incident through the upper polarizing plate by about ¼ wavelength, thereby passing through right-circularly polarized light converted from the light of the right eye image.

A left eye polarizing filter of the polarizing glasses 310 passes through only the left-circularly polarized light, and a right eye polarizing filter of the polarizing glasses 310 passes through only the right-circularly polarized light. If a viewer wears the polarizing glasses 310, he or she sees only pixels of the odd-numbered lines of the pixel array on which, the left eye image is displayed, through his/her left eye and also sees only pixels of the even-numbered lines of the pixel array on which, the right eye image is displayed, through his/her right eye.

The stereoscopic image display according to the embodiment of the invention further includes a display panel driving circuit, a backlight driving circuit, and a control circuit.

The display panel driving circuit includes a data driving circuit 102 and a gate driving circuit 103.

The data driving circuit 102 includes a plurality of source driver ICs (integrated circuits). Each of the source driver ICs includes a shift register, a latch, a digital-to-analog converter (DAC), an output buffer, etc. The data driving circuit 102 latches digital video data RGB of the 2D and 3D images under the control of a timing controller 101. The data driving circuit 102 converts the digital video data RGB into positive and negative analog gamma compensation voltages in response to a polarity control signal POL, thereby inverting a polarity of a data voltage. The data driving circuit 102 outputs the positive and negative data voltages to the data lines DL in response to a source output enable SOE. In a 2D mode, the data driving circuit 102 outputs the data voltages of the 2D image, which is not divided into the left eye image and the right eye image. In a 3D mode, the data driving circuit 102 supplies the data voltage of the left eye image and the data voltage of the right eye image to the data lines DL (refer to FIGS. 15 and 16).

The gate driving circuit 103 includes a shift register, a level shifter, etc. The gate driving circuit 103 sequentially supplies a gate pulse (or a scan pulse, refer to FIGS. 15 and 16), which is synchronized with the data voltage supplied to the data lines DL, to the gate lines GL under the control of the timing controller 101.

The backlight driving circuit includes a backlight controller 206 and a light source driving circuit 208.

The backlight controller 206 supplies backlight control data including a duty ratio adjustment value of a pulse width modulation (PWM) signal to the light source driving circuit 208 in a serial peripheral interface (SPI) data format in response to a backlight control signal BL received from the timing controller 101 or a host system 104, so as to alternatively turn on the upper light source 202 and the lower light source 204 every one frame period. The backlight controller 206 may be mounted inside the timing controller 101.

The light source driving circuit 208 turns on and off the light sources 202 and 204 of the backlight unit in a PWM manner in response to the backlight control data received from the backlight controller 206, thereby alternatively turning on the upper light source 202 and the lower light source 204 every one frame period.

The control circuit includes the timing controller 101, a 3D data formatter 105, and the host system 104.

The timing controller 101 receives timing signals, such as a vertical sync signal Vsync, a horizontal sync signal Hsync, a data enable DE, and a dot clock CLK, from the host system 104. The timing controller 101 generates a gate timing control signal for controlling operation timing of the gate driving circuit 103 and a data timing control signal for controlling operation timing of the data driving circuit 102 and a polarity of the data voltage based on the timing signals. The timing controller 101 receives a mode signal MODE from the host system 104 and may decide the 2D mode or the 3D mode.

The gate timing control signal includes a gate start pulse GSP, a gate shift clock GSC, a gate output enable GOE, etc. The gate start pulse GSP controls a start operation timing of the gate driving circuit 103. The gate shift clock GSC is a clock for shifting the gate start pulse GSP. The gate output enable GOE controls an output timing of the gate driving circuit 103.

The data timing control signal includes a source start pulse SSP, a source sampling clock SSC, a polarity control signal POL, a source output enable SOE, etc. The source start pulse SSP controls a data sampling start timing of the data driving circuit 102. The source sampling clock SSC is a clock for shifting the source start pulse SSP and controls a sampling timing of data. The polarity control signal POL controls a polarity of the data voltage output from the data driving circuit 102. The source output enable SOE controls a data voltage output timing and a charge sharing timing of the data driving circuit 102. If the digital video data RGB to be input to the data driving circuit 102 is transferred based on a mini low voltage differential signaling (LVDS) interface standard, the source start pulse SSP and the source sampling clock SSC may be omitted.

The timing controller 101 controls operation timing of the display panel driving circuit and operation timing of the backlight driving circuit at a frame frequency of (input frame frequency×i) Hz, where 'i' is a positive integer equal to or greater than 2. Hence, the timing controller 101 may synchronize the operation of the display panel driving circuit with the operation of the backlight driving circuit at the frame frequency. The input frame frequency is 50 Hz in a phase alternate line (PAL) manner and is 60 Hz in a national television standards committee (NTSC) manner. The liquid crystal display panel 100 and the light sources 202 and 204 may be driven at the frame frequency such as 100 Hz, 120 Hz, 200 Hz, and 240 Hz.

Figure 15:
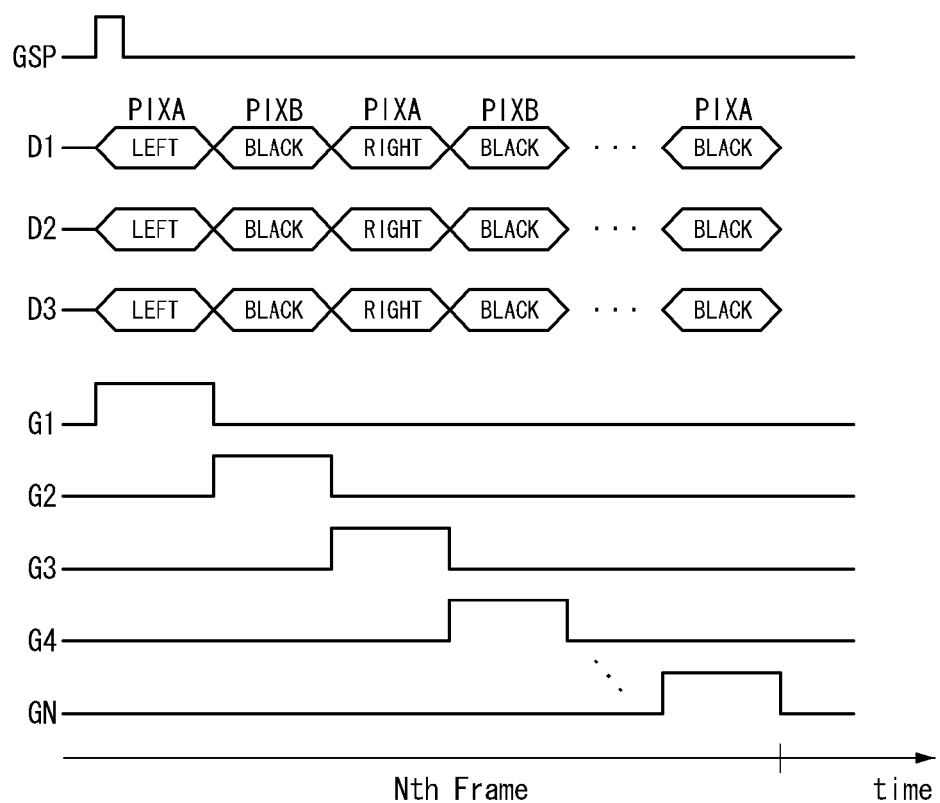
FIG. 15 is a waveform diagram illustrating a data voltage supplied to data lines of a liquid crystal display panel and a gate pulse supplied to gate lines of the liquid crystal display panel during an Nth frame period.
Figure 16:
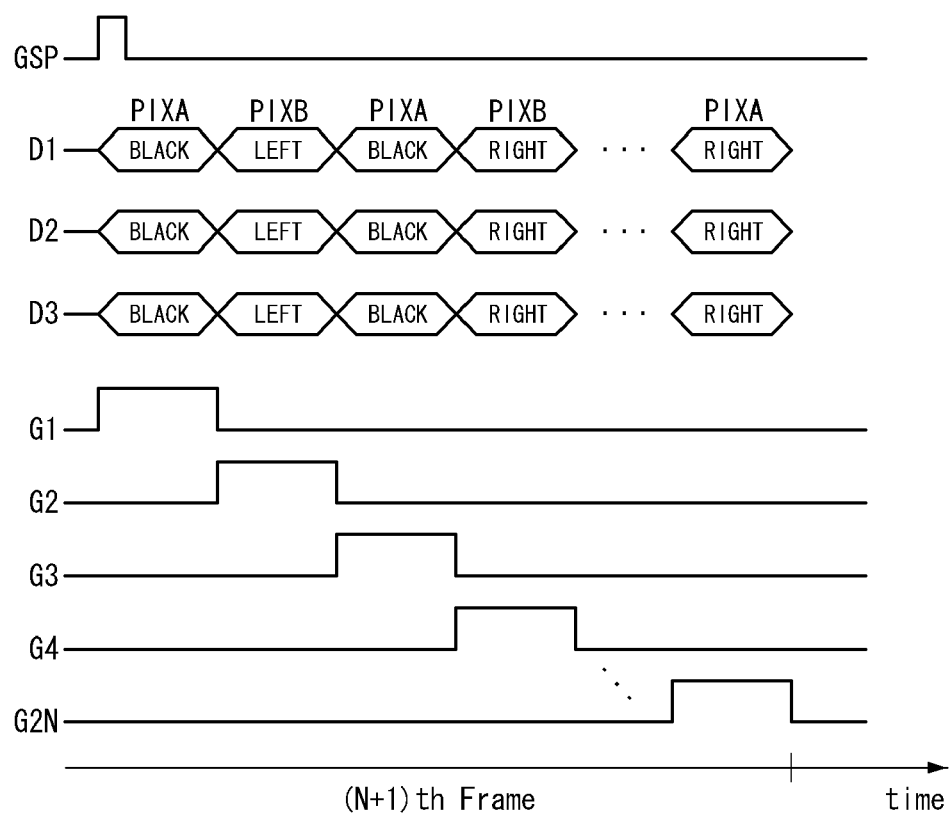
FIG. 16 is a waveform diagram illustrating a data voltage supplied to data lines of a liquid crystal display panel and a gate pulse supplied to gate lines of the liquid crystal display panel during an (N+1)th frame period.

The 3D data formatter 105 receives the 3D image data from the host system 104 and divides the 3D image data into left eye image data and right eye image data based on each line. The 3D data formatter 105 then transfers the left eye image data and the right eye image data to the timing controller 101. As shown in FIGS. 15 and 16, the timing controller 101 inserts black gray level digital data between the left eye image data and the right eye image data received from the 3D data formatter 105, so that black gray level data may be inserted between the left eye image data and the right eye image data. The timing controller 101 may transfer the black gray level digital data to the data driving circuit 102.

The host system 104 supplies the digital video data RGB of the 2D and 3D images and the timing signals Vsync, Hsync, DE and CLK to the timing controller 101 through an interface, such as an LVDS interface and a transition minimized differential signaling (TMDS) interface. The host system 104 supplies the mode signal MODE indicating the 2D mode and the 3D mode to the timing controller 101. The host system 104 supplies the 2D image data to the timing controller 101 in the 2D mode. On the other hand, in the 3D mode, the host system 104 supplies the 3D image data including the left eye image and the right eye image to the 3D data formatter 105.

A user may select the 2D mode or the 3D mode using a user input device 110. The user input device 110 includes a touch screen, an on-screen display (OSD), a keyboard, a mouse, a remote controller, etc. that are attached to or mounted inside the liquid crystal display panel 100.

The host system 104 switches between an operation of the 2D mode and an operation of the 3D mode in response to user data input through the user input device 110. The host system 104 detects a 2D/3D identification code encoded to data of an input image, for example, a 2D/3D identification code capable of being coded to an electronic program guide (EPG) or an electronic service guide (ESG) of a digital broadcasting standard, thereby deciding the 2D mode and the 3D mode.

Figure 8:
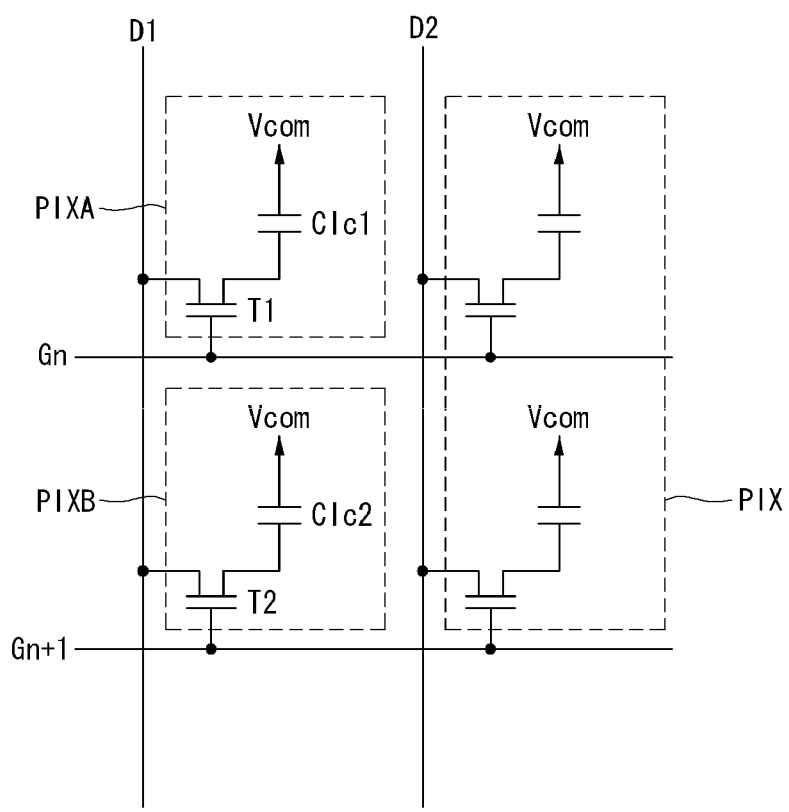
FIG. 8 is an equivalent circuit diagram illustrating a portion of a pixel array of a liquid crystal display panel.

FIG. 8 is an equivalent circuit diagram illustrating a portion of the pixel array of the liquid crystal display panel 100.

As shown in FIG. 8, each of pixels of the pixel array includes red (R), green (G), and blue (B) subpixels. Each of the R, G, and B subpixels includes first and second cells PIXA and PIXB, which are arranged in a vertical direction. The first and second cells PIXA and PIXB have the same pixel pitch and the same pixel structure.

The first cell PIXA includes a TFT T1 formed at a crossing of data lines D1 and D2 and an-nth gate line Gn, where n is a natural number, a first liquid crystal cell Clc1 connected to the TFT T1, and a storage capacitor (not shown) connected to the first liquid crystal cell Clc1. The second cell PIXB includes a TFT T2 formed at a crossing of the data lines D1 and D2 and an (n+1)th gate line Gn+1, a second liquid crystal cell Clc2 connected to the TFT T2, and a storage capacitor (not shown) connected to the second liquid crystal cell Clc2.

In the 2D mode, the first and second cells PIXA and PIXB are charged to the 2D image data and display the 2D image data.

In the 3D mode, as shown in FIGS. 9 to 16, the first cell PIXA displays left eye image data and right eye image data during the Nth frame period, in which the upper light source 202 is turned on. On the other hand, the first cell PIXA represents the black gray level during the (N+1)th frame period, in which the lower light source 204 is turned on, thereby serving as an active black stripe BS. Further, the second cell PIXB represents the black gray level during the Nth frame period, in which the upper light source 202 is turned on, thereby serving as the active black stripe BS. On the other hand, the second cell PIXB displays the left eye image data and the right eye image data during the (N+1)th frame period, in which the lower light source 204 is turned on.

Figure 9:
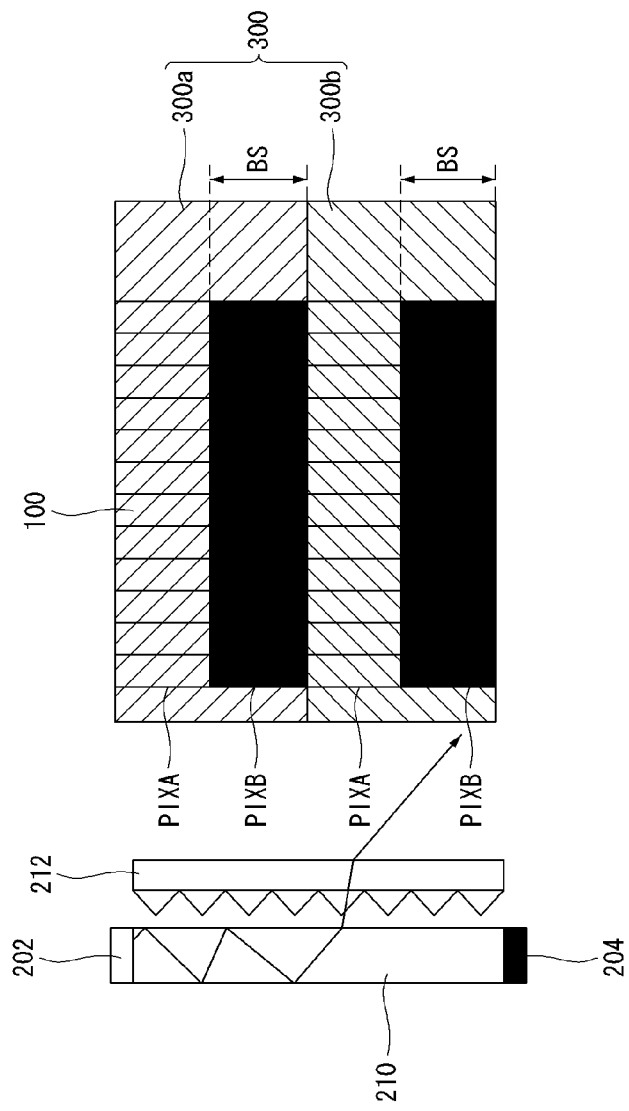
FIG. 9 illustrates an operation of a backlight unit and an operation of a pixel array during an Nth frame period.
Figure 10:
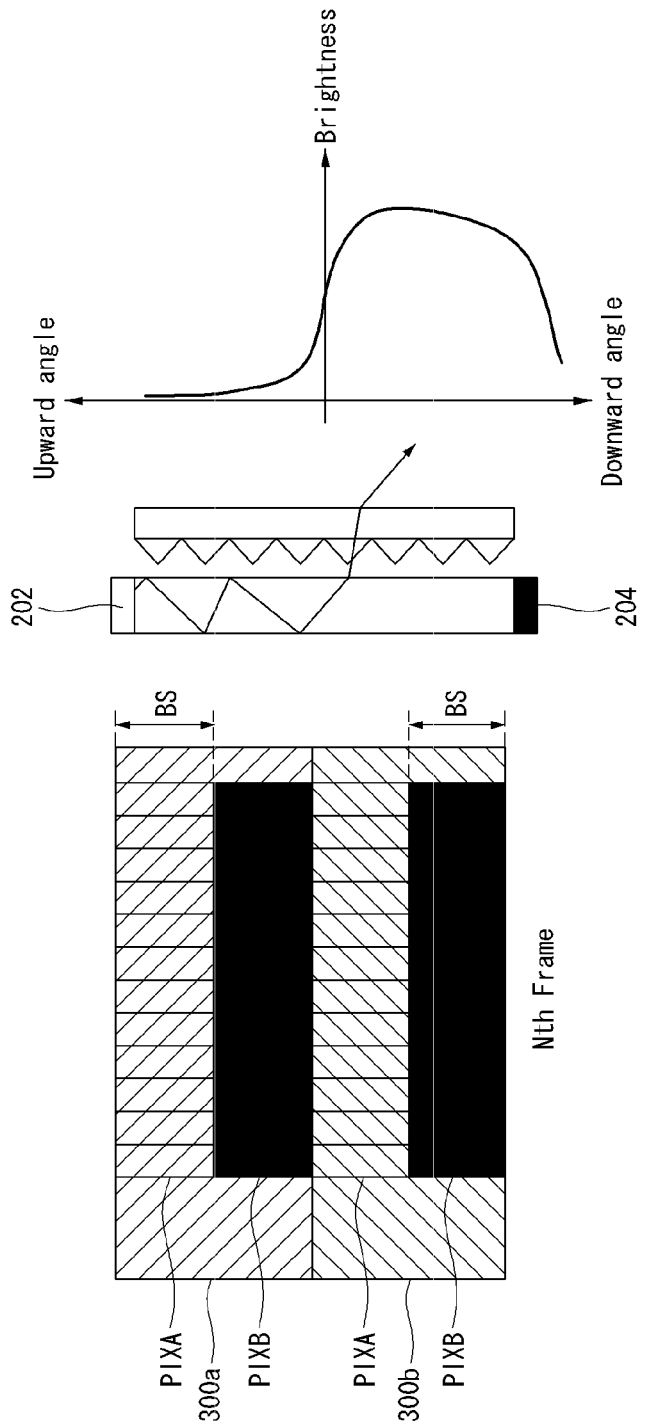
FIG. 10 illustrates a distribution of an amount of light provided by a backlight unit during an Nth frame period.

FIG. 9 illustrates an operation of the backlight unit and an operation of the pixel array during the Nth frame period. FIG. 10 illustrates a distribution of an amount of light provided by the backlight unit during the Nth frame period.

As shown in FIGS. 9 and 10, each of the odd-numbered lines and the even-numbered lines of the liquid crystal display panel 100 includes a first subline including the first cells PIXA and a second subline including the second cells PIXB.

The lower light source 204 is turned off during the Nth frame period. The upper light source 202 is turned on during the Nth frame period, and light from the upper light source 202 is converted into a surface light source through a light guide plate 210. Light passing through the light guide plate 210 is incident on a vertical viewing angle improvement sheet 212. Prism patterns opposite the light guide plate 210 are formed on one surface of the vertical viewing angle improvement sheet 212. In other words, light from the upper light source 202 passes through the light guide plate 210 and is incident on the vertical viewing angle improvement sheet 212. Further, the light is condensed at the downward angle by the prism patterns of the vertical viewing angle improvement sheet 212. A distribution of an amount of light provided by the backlight unit during the Nth frame period is shown in FIG. 10.

During the Nth frame period, pixels of the first subline including the first cells PIXA in each line of the pixel array display the left eye image data and the right eye image data, and pixels of the second subline including the second cells PIXB represent the black gray level. Thus, the second subline including the second cells PIXB serves as the active black stripe BS during the Nth frame period.

The first pattern 300b of the patterned retarder 300 is opposite to the first and second cells PIXA and PIXB belonging to the odd-numbered lines of the liquid crystal display panel 100. The second pattern 300a of the patterned retarder 300 is opposite to the first and second cells PIXA and PIXB belonging to the even-numbered lines of the liquid crystal display panel 100. A pattern width of the patterned retarder 300 is substantially equal to a sum (i.e., 2-pixel pitch) of widths of the first and second cells PIXA and PIXB, so as to prevent 3D crosstalk. Further, a boundary between the first pattern 300b and the second pattern 300a of the patterned retarder 300 has to be substantially identical to a boundary between the odd-numbered line and the even-numbered line of the liquid crystal display panel 100, so as to prevent the 3D crosstalk.

The first cells PIXA belonging to the first subline of the odd-numbered line may display the left eye image, and the first cells PIXA belonging to the first subline of the even-numbered line may display the right eye image. In this instance, light of the left eye image displayed on the first cells PIXA belonging to the first subline of the odd-numbered line is converted into linearly polarized light through the upper polarizing plate and is incident on the first pattern 300b of the patterned retarder 300. The linearly polarized light is converted into left-circularly polarized light through the first pattern 300b. Further, light of the right eye image displayed on the first cells PIXA belonging to the first subline of the even-numbered line is converted into linearly polarized light through the upper polarizing plate and is incident on the second pattern 300a of the patterned retarder 300. The linearly polarized light is converted into right-circularly polarized light through the second pattern 300a.

The left eye polarizing filter of the polarizing glasses 310 passes through only the left-circularly polarized light, and the right eye polarizing filter of the polarizing glasses 310 passes through only the right-circularly polarized light. Thus, the viewer may see the first cells PIXA belonging to the first subline of the odd-numbered line through the left eye polarizing filter of the polarizing glasses 310 and may see the first cells PIXA belonging to the first subline of the even-numbered line through the right eye polarizing filter of the polarizing glasses 310 during the Nth frame period.

Figure 11:
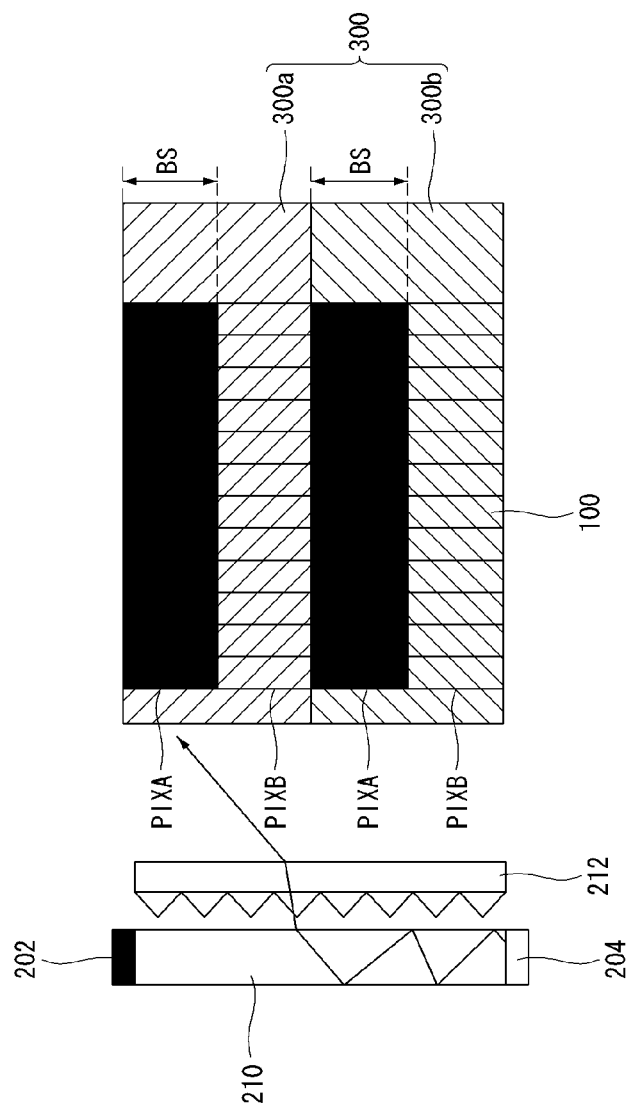
FIG. 11 illustrates an operation of a backlight unit and an operation of a pixel array during-an (N+1)th frame period.
Figure 12:
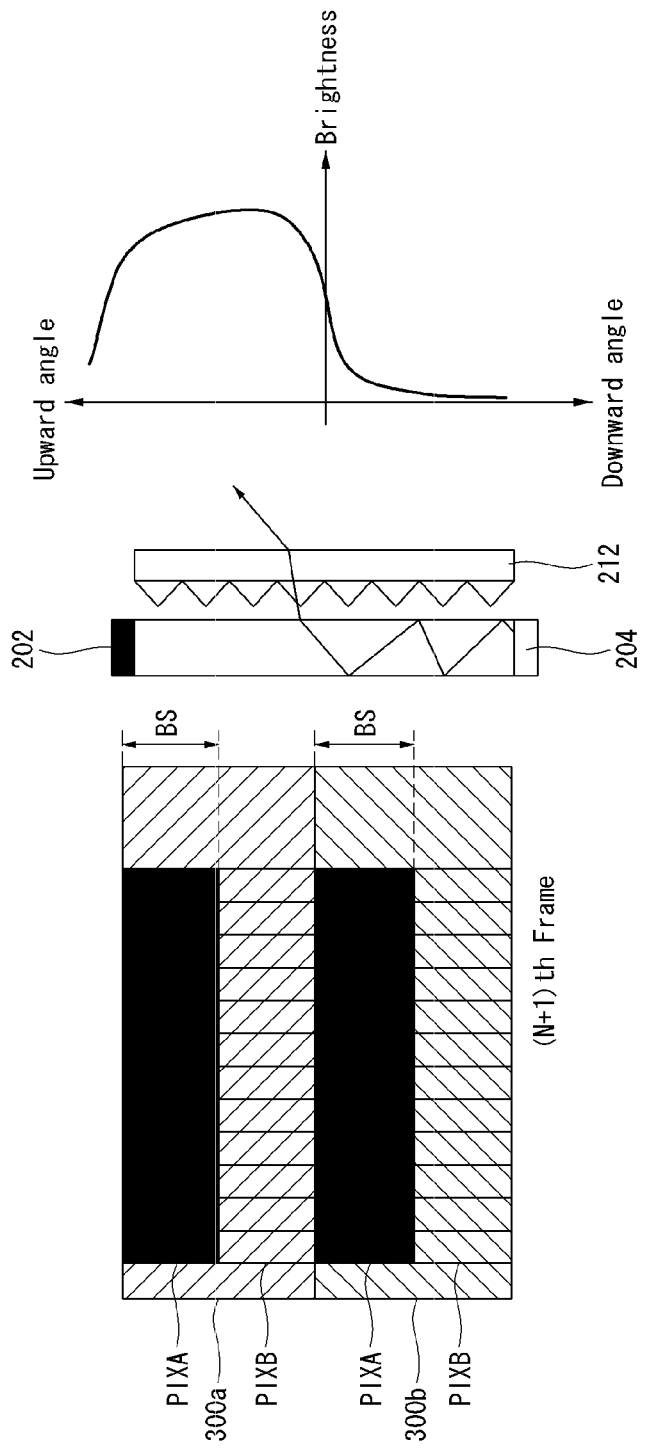
FIG. 12 illustrates a distribution of an amount of light provided by a backlight unit during an (N+1)th frame period.

FIG. 11 illustrates an operation of the backlight unit and an operation of the pixel array during the (N+1)th frame period. FIG. 12 illustrates a distribution of an amount of light provided by the backlight unit during the (N+1)th frame period.

As shown in FIGS. 11 and 12, each of the odd-numbered lines and the even-numbered lines of the liquid crystal display panel 100 includes a first subline including the first cells PIXA and a second subline including the second cells PIXB.

The upper light source 202 is turned off during the (N+1)th frame period. The lower light source 204 is turned on during the (N+1)th frame period, and light from the lower light source 204 is converted into a surface light source through the light guide plate 210. Light passing through the light guide plate 210 is incident on the vertical viewing angle improvement sheet 212. In other words, light from the lower light source 204 passes through the light guide plate 210 and is incident on the vertical viewing angle improvement sheet 212. Further, the light is condensed at the upward angle by the prism patterns of the vertical viewing angle improvement sheet 212. A distribution of an amount of light provided by the backlight unit during the (N+1)th frame period is shown in FIG. 12.

During the (N+1)th frame period, pixels of the first subline including the first cells PIXA in each line of the pixel array represent the black gray level, and pixels of the second subline including the second cells PIXB display the left eye image data and the right eye image data. Thus, the first sublines including the first cells PIXA serve as the active black stripe BS during the (N+1)th frame period.

The first pattern 300b of the patterned retarder 300 is opposite to the first and second cells PIXA and PIXB belonging to the odd-numbered lines of the liquid crystal display panel 100. The second pattern 300a of the patterned retarder 300 is opposite to the first and second cells PIXA and PIXB belonging to the even-numbered lines of the liquid crystal display panel 100. A pattern width of the patterned retarder 300 is substantially equal to a sum (i.e., 2-pixel pitch) of widths of the first and second cells PIXA and PIXB, so as to prevent the 3D crosstalk. Further, a boundary between the first pattern 300b and the second pattern 300a of the patterned retarder 300 has to be substantially identical to a boundary between the odd-numbered line and the even-numbered line of the liquid crystal display panel 100, so as to prevent the 3D crosstalk.

The second cells PIXB belonging to the second subline of the odd-numbered line may display the left eye image, and the second cells PIXB belonging to the second subline of the even-numbered line may display the right eye image. In this instance, light of the left eye image displayed on the second cells PIXB belonging to the second subline of the odd-numbered line is converted into linearly polarized light through the upper polarizing plate and is incident on the first pattern 300b of the patterned retarder 300. The linearly polarized light is converted into left-circularly polarized light through the first pattern 300b. Further, light of the right eye image displayed on the second cells PIXB belonging to the second subline of the even-numbered line is converted into linearly polarized light through the upper polarizing plate and is incident on the second pattern 300a of the patterned retarder 300. The linearly polarized light is converted into right-circularly polarized light through the second pattern 300a.

The left eye polarizing filter of the polarizing glasses 310 passes through only the left-circularly polarized light, and the right eye polarizing filter of the polarizing glasses 310 passes through only the right-circularly polarized light. Thus, the viewer may see the second cells PIXB belonging to the second subline of the odd-numbered line through the left eye polarizing filter of the polarizing glasses 310 and may see the second cells PIXB belonging to the second subline of the even-numbered line through the right eye polarizing filter of the polarizing glasses 310 during the (N+1)th frame period.

Figure 13:
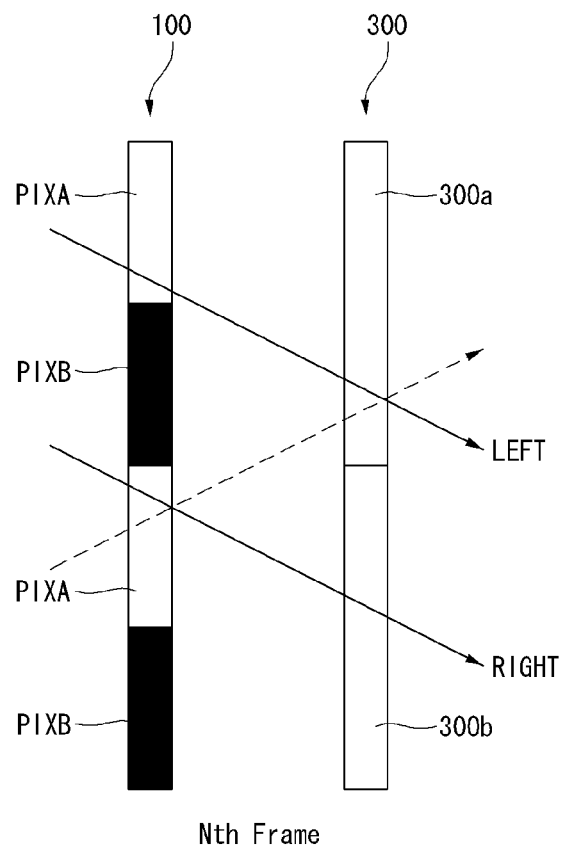
FIG. 13 illustrates a path of light passing through first cells of a pixel array during an Nth frame period.

FIG. 13 illustrates a path of light passing through the first cells PIXA of the pixel array during the Nth frame period.

As shown in FIG. 13, light from the upper light source 202 is condensed at the downward angle by the vertical viewing angle improvement sheet 212 during the Nth frame period. As a result, the light passes through the first cells PIXA of the pixel array and is irradiated onto the first pattern 300b or the second pattern 300a of the patterned retarder 300.

During the Nth frame period, light passing through the first cells PIXA of the odd-numbered line passes through the first pattern 300b of the patterned retarder 300 opposite to the odd-numbered line at the large vertical viewing angle as indicated by the arrow of the solid line shown in FIG. 13. Further, light passing through the first cells PIXA of the even-numbered line passes through the second pattern 300a of the patterned retarder 300 opposite to the even-numbered line at the large vertical viewing angle as indicated by the arrow of the solid line shown in FIG. 13.

During the Nth frame period, the light passing through the first cells PIXA of the odd-numbered line does not pass through the second pattern 300a of the patterned retarder 300 opposite to the line (i.e., the even-numbered line) downward adjacent to the odd-numbered line even at the relatively large vertical viewing angle because of the second cells PIXB serving as the active black stripe. Further, during the Nth frame period, the light passing through the first cells PIXA of the even-numbered line does not pass through the first pattern 300b of the patterned retarder 300 opposite to the line (i.e., the odd-numbered line) downward adjacent to the even-numbered line even at the relatively large vertical viewing angle because of the second cells PIXB serving as the active black stripe. Thus, the 3D crosstalk is not generated even at the relatively large vertical viewing angle during the Nth frame period.

If the lower light source 204 is turned on during the Nth frame period, light passing through the first cells PIXA of one line in the pixel array may pass through the pattern 300a (or 300a) of the patterned retarder 300 opposite to another line adjacent to the one line even at the relatively small vertical viewing angle as indicated by the arrow of the dotted line shown in FIG. 13. Therefore, the 3D crosstalk may be generated even at the relatively small vertical viewing angle.

Figure 14:
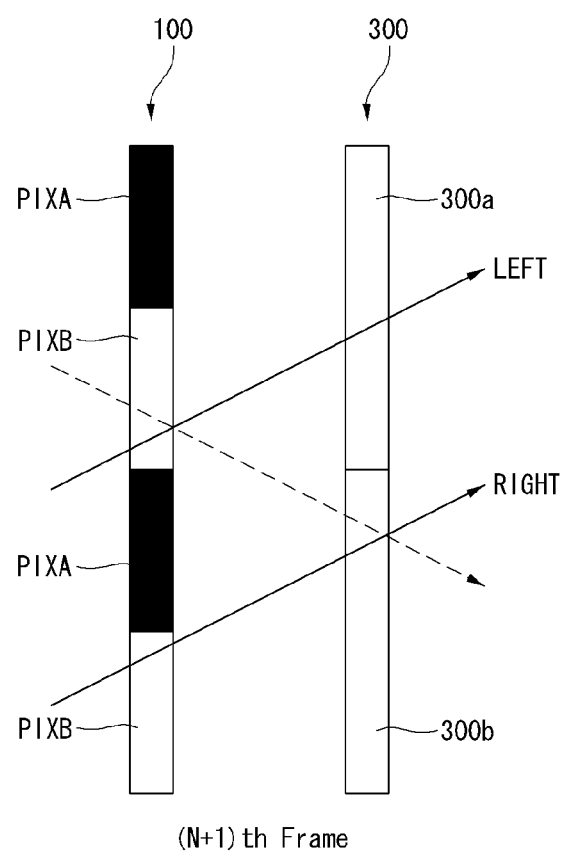
FIG. 14 illustrates a path of light passing through second cells of a pixel array during an (N+1)th frame period.

FIG. 14 illustrates a path of light passing through the second cells PIXB of the pixel array during the (N+1)th frame period.

As shown in FIG. 14, light from the lower light source 204 is condensed at the upward angle by the vertical viewing angle improvement sheet 212 during the (N+1)th frame period. As a result, the light passes through the second cells PIXB of the pixel array and is irradiated onto the first pattern 300b or the second pattern 300a of the patterned retarder 300.

During the (N+1)th frame period, light passing through the second cells PIXB of the odd-numbered line passes through the first pattern 300b of the patterned retarder 300 opposite to the odd-numbered line at the large vertical viewing angle as indicated by the arrow of the solid line shown in FIG. 14. Further, light passing through the second cells PIXB of the even-numbered line passes through the second pattern 300a of the patterned retarder 300 opposite to the even-numbered line at the large vertical viewing angle as indicated by the arrow of the solid line shown in FIG. 14.

During the (N+1)th frame period, the light passing through the second cells PIXB of the odd-numbered line does not pass through the second pattern 300a of the patterned retarder 300 opposite to the line (i.e., the even-numbered line) upward adjacent to the odd-numbered line even at the relatively large vertical viewing angle because of the first cells PIXA serving as the active black stripe. Further, during the (N+1)th frame period, the light passing through the second cells PIXB of the even-numbered line does not pass through the first pattern 300b of the patterned retarder 300 opposite to the line (i.e., the odd-numbered line) upward adjacent to the even-numbered line even at the relatively large vertical viewing angle because of the first cells PIXA serving as the active black stripe. Thus, the 3D crosstalk is not generated even at the relatively large vertical viewing angle during the (N+1)th frame period.

If the upper light source 202 is turned on during the (N+1)th frame period, light passing through the second cells PIXB of one line in the pixel array may pass through the pattern 300a (or 300a) of the patterned retarder 300 opposite to another line adjacent to the one line even at the relatively small vertical viewing angle as indicated by the arrow of the dotted line shown in FIG. 14. Therefore, the 3D crosstalk may be generated even at the relatively small vertical viewing angle.

FIG. 15 is a waveform diagram illustrating the data voltage supplied to the data lines D1 to D3 of the liquid crystal display panel 100 and the gate pulse supplied to the gate lines G1 to GN of the liquid crystal display panel 100 during the Nth frame period. In FIG. 15, 'GSP' indicates the gate start pulse.

As shown in FIG. 15, the data driving circuit 102 alternatively supplies a left eye image data voltage LEFT and a right eye image data voltage RIGHT to the data lines D1 to D3 every one odd-numbered horizontal period of the Nth frame period. Further, the data driving circuit 102 supplies a black gray level voltage BLACK to the data lines D1 to D3 during even-numbered horizontal periods of the Nth frame period.

The gate driving circuit 103 sequentially supplies the gate pulse synchronized with the left eye image data voltage LEFT, the right eye image data voltage RIGHT, and the black gray level voltage BLACK to the gate lines G1 to GN. More specifically, the gate pulse synchronized with the left and right eye image data voltages LEFT and RIGHT is applied to odd-numbered gate lines G1, G3, . . . , and GN−1 (corresponding to 'Gn' in FIG. 8) during the odd-numbered horizontal periods of the Nth frame period. Further, the gate pulse synchronized with the black gray level voltage BLACK is applied to even-numbered gate lines G2, G4, . . . , and GN (corresponding to 'Gn+1' in FIG. 8) during the even-numbered horizontal periods of the Nth frame period.

Accordingly, the left and right eye image data voltages LEFT and RIGHT are supplied to the first cells PIXA belonging to the first subline of each line of the pixel array during the Nth frame period. On the other hand, the black gray level voltage BLACK is supplied to the second cells PIXB belonging to the second subline of each line of the pixel array during the Nth frame period.

FIG. 16 is a waveform diagram illustrating the data voltage supplied to the data lines DI to D3 of the liquid crystal display panel 100 and the gate pulse supplied to the gate lines 01 to GN of the liquid crystal display panel 100 during the (N+1)th frame period.

As shown in FIG. 16, the data driving circuit 102 supplies the black gray level voltage BLACK to the data lines D1 to D3 during the odd-numbered horizontal periods of the (N+1)th frame period. Further, the data driving circuit 102 alternatively supplies the left eye image data voltage LEFT and the right eye image data voltage RIGHT to the data lines D1 to D3 every one even-numbered horizontal period of the (N+1)th frame period.

The gate driving circuit 103 sequentially supplies the gate pulse synchronized with the left eye image data voltage LEFT, the right eye image data voltage RIGHT, and the black gray level voltage BLACK to the gate lines G1 to GN. More specifically, the gate pulse synchronized with the black gray level voltage BLACK is applied to the odd-numbered gate lines G1, G3, ..., and GN−1 (corresponding to 'On' in FIG. 8) during the odd-numbered horizontal periods of the (N+1)th frame period. Further, the gate pulse synchronized with the left and right eye image data voltages LEFT and RIGHT is applied to the even-numbered gate lines G2, G4, ..., and GN (corresponding to 'Gn+1' in FIG. 8) during the even-numbered horizontal periods of the (N+1)th frame period.

Accordingly, the black gray level voltage BLACK is supplied to the first cells PIXA belonging to the first subline of each line of the pixel array during the (N+1)th frame period. On the other hand, the left and right eye image data voltages LEFT and RIGHT are supplied to the second cells PIXB belonging to the second subline of each line of the pixel array during the (N+1)th frame period.

Figure 17:
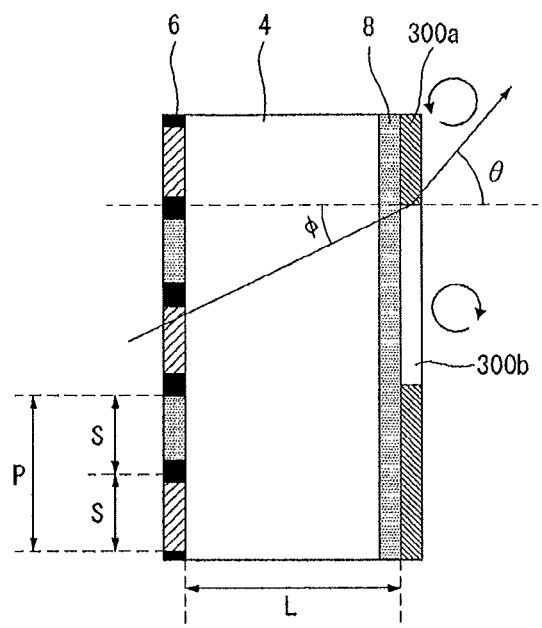
FIG. 17 theoretically illustrates a vertical viewing angle in a stereoscopic image display according to an exemplary embodiment of the invention.

FIG. 17 and the following Equations (4) to (6) theoretically illustrate an improvement effect of the vertical viewing angle in the stereoscopic image display according to the embodiment of the invention.

Equation (4) indicates geometric conditions inside a medium (i.e., the glass substrate and the polarizing plate). In Equation (4), '$CT_{ref}$' is an allowable maximum value of the 3D crosstalk, and 'S' is a pixel pitch of each of the first and second cells PIXA and PIXB serving as the active black stripe. Equation (5) indicates a relationship between an angle Φ of light traveling inside the medium by Snell's law and an angle θ of light emitted to the outside through the patterned retarder. 'θ' is a vertical viewing angle. Equation (6) is obtained through Equations (4) and (5).

$$S \cdot CT_{ref} + S = L\tan\phi \quad (4)$$

$$n\sin\phi = \sin\theta \quad (5)$$

$$\theta = \sin^{-1}\left\{n\sin\left(\tan^{-1}\left(\frac{S \cdot (1 + CT_{ref})}{L}\right)\right)\right\} \quad (6)$$

In the case of 47-inch FHD (full high definition) panel, P is 540 μm, S is 270 μm, L is 900, and n is 1.5 based on the 3D crosstalk of about 7%. When the above values are substituted for Equation (6), the vertical viewing angle satisfying the 3D crosstalk equal to or less than about 7% is estimated to be about 27.3° as shown in FIG. 18. The vertical viewing angle in the embodiment of the invention may increase to about two times the related art vertical viewing angle by increasing the pixel pitch S of each of the first and second cells PIXA and PIXB.

Figure 19:
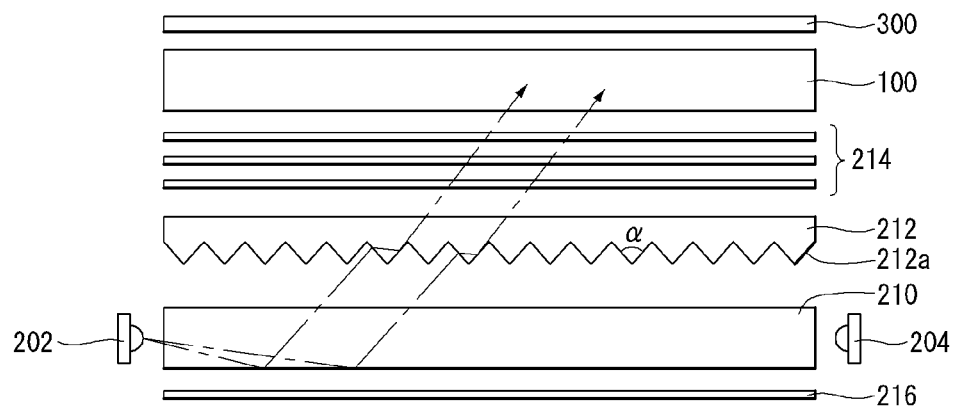
FIGS. 19 and 20 illustrate a structure of a backlight unit according to a first embodiment of the invention and a light path in each frame period.
Figure 20:
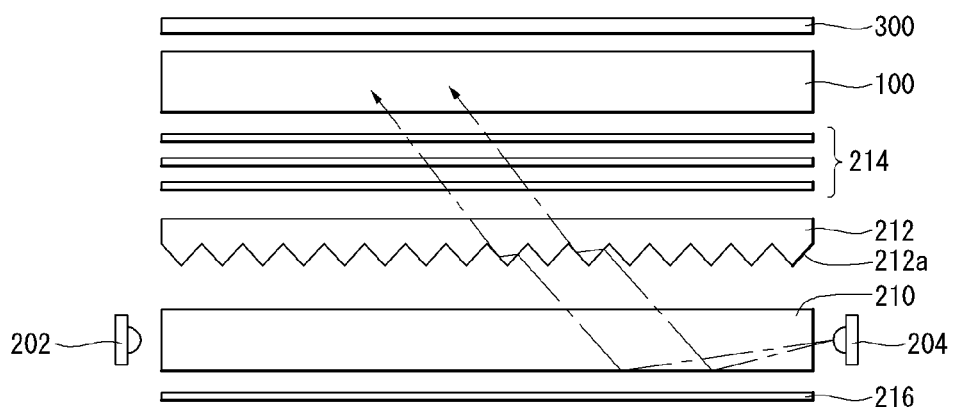

FIGS. 19 and 20 illustrate a structure of a backlight unit according to a first embodiment of the invention and a light path in each frame period.

As shown in FIGS. 19 and 20, the backlight unit according to the first embodiment of the invention includes a light guide plate 210 disposed between an upper light source 202 and a lower light source 204, a vertical viewing angle improvement sheet 212 disposed between the light guide plate 210 and the liquid crystal display panel 100, and optical sheets 214 disposed between the vertical viewing angle improvement sheet 212 and the liquid crystal display panel 100. The optical sheets 214 may generally include a prism sheet and a diffusion sheet. Alternatively, the optical sheets 214 may be omitted. In FIGS. 19 and 20, a reflection plate 216 is disposed under the light guide plate 201 to reflect the light traveling in the direction of a bottom case.

The vertical viewing angle improvement sheet 212 has prism patterns 212a each having a triangular cross-section on the surface opposite to the light guide plate 210. When the upper light source 202 is turned on, the prism patterns 212a condense light incident through the light guide plate 210 at an angle shown in FIG. 19. When the lower light source 204 is turned on, the prism patterns 212a condense light incident through the light guide plate 210 at an angle shown in FIG. 20.

Figure 21:
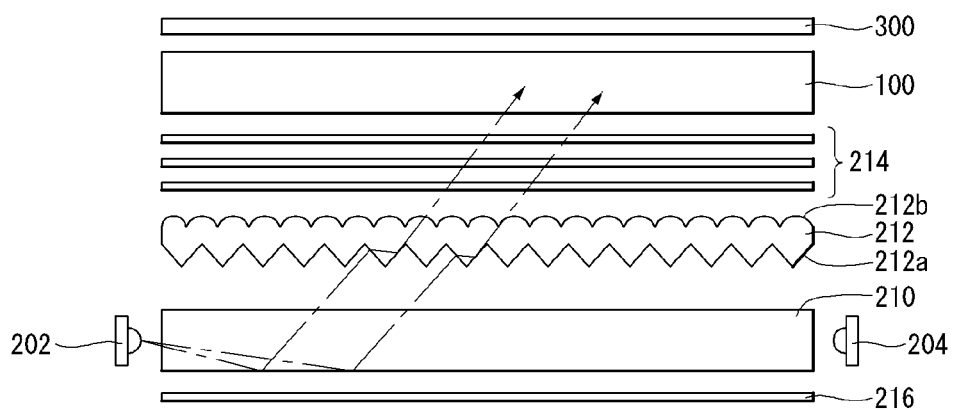
FIGS. 21 and 22 illustrate a structure of a backlight unit according to a second embodiment of the invention and a light path in each frame period.
Figure 22:
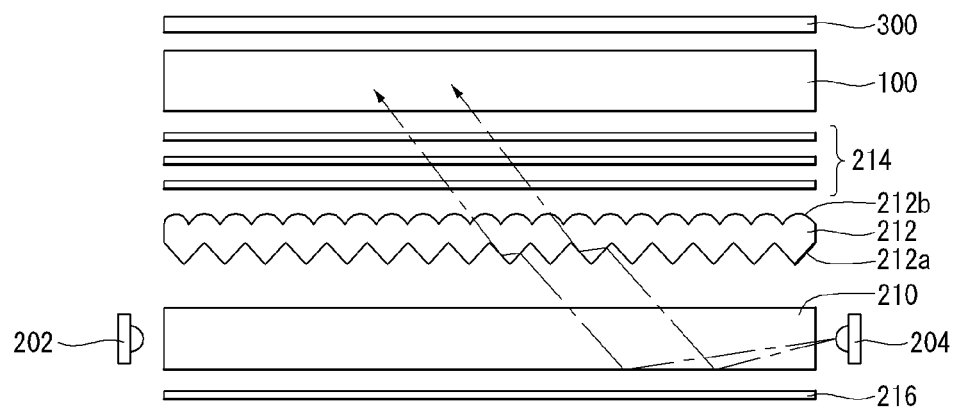

FIGS. 21 and 22 illustrate a structure of a backlight unit according to a second embodiment of the invention and a light path in each frame period.

As shown in FIGS. 21 and 22, since the backlight unit according to the second embodiment of the invention is substantially the same as the backlight unit according to the first embodiment of the invention except a vertical viewing angle improvement sheet 212, a further description may be briefly made or may be entirely omitted.

The vertical viewing angle improvement sheet 212 has prism patterns 212a having each a triangular cross-section on a lower surface opposite to the light guide plate 210 and lenticular lens patterns 212b having each a hemispherical cross-section on an upper surface opposite to the liquid crystal display panel 100. The lenticular lens patterns 212b improve rectilinear propagation of light passing through the prism patterns 212a.

As described above, the stereoscopic image display according to the embodiment of the invention condenses light irradiated onto the liquid crystal display panel in a predetermined direction using the upper light source, the lower light source, and the vertical viewing angle improvement sheet, thereby increasing the vertical viewing angle and increasing the transmittance in the 2D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
a liquid crystal display panel including data lines, gate lines crossing the data lines, and a pixel array including pixels arranged in a matrix form;
a patterned retarder attached to the liquid crystal display panel;
polarizing glasses including a left eye filter passing through only a first polarized light passing through a first pattern of the patterned retarder and a right eye filter passing through only a second polarized light passing through a second pattern of the patterned retarder;
a backlight unit including an upper light source disposed under the upper side of the liquid crystal display panel, a lower light source disposed under the lower side of the liquid crystal display panel, a light guide plate disposed between the upper light source and the lower light source, and a vertical viewing angle improvement sheet having prism patterns opposite to the light guide plate; and
a controller that controls the liquid crystal display panel according to at least one of a 2D mode for display a 2D image and a 3D mode for displaying a 3D image
wherein each of the pixels of the pixel array is divided into a first cell positioned on the upper side and a second cell positioned on the lower side, and an odd-number lines and even-numbered lines of the pixel array each include a first subline, on which the first cells are disposed, and a second subline, on which the second cells are disposed, and
wherein the controller controls the 3D mode such that, during the Nth frame period, where N is a natural number, the upper light source is turned on, left eye image data and right eye image data are displayed on the first cells, and black gray level data is displayed on the second cells, and during an (N+1)th frame period, the lower light source is turned on, the black grey level data is displayed on the first cells, and the left eye image
data and the right eye image data are displayed on the second cells.

2. The stereoscopic image display of claim 1, wherein the first pattern of the patterned retarder is positioned opposite the first and second sublines of the odd-numbered line in the pixel array and passes through light incident from the first and second sublines of the odd-numbered line as the first polarized light,
wherein the second pattern of the patterned retarder is positioned opposite the first and second sublines of the even-numbered line in the pixel array and passes through light incident from the first and second sublines of the even-numbered line as the second polarized light.

3. The stereoscopic image display of claim 2, wherein a boundary between the first and second patterns of the patterned retarder is substantially identical to a boundary between the odd-numbered line and the even-numbered line of the pixel array.

4. The stereoscopic image display of claim 1, wherein the vertical viewing angle improvement sheet has lenticular lens patterns on an upper surface of the vertical viewing angle improvement sheet opposite the liquid crystal display panel.

* * * * *